Oct. 13, 1925.                                                                   1,556,970
H. J. SPROAT
LUBRICATOR MEANS FOR CRANK SHAFTS IN INTERNAL COMBUSTION ENGINES
Filed May 20, 1922
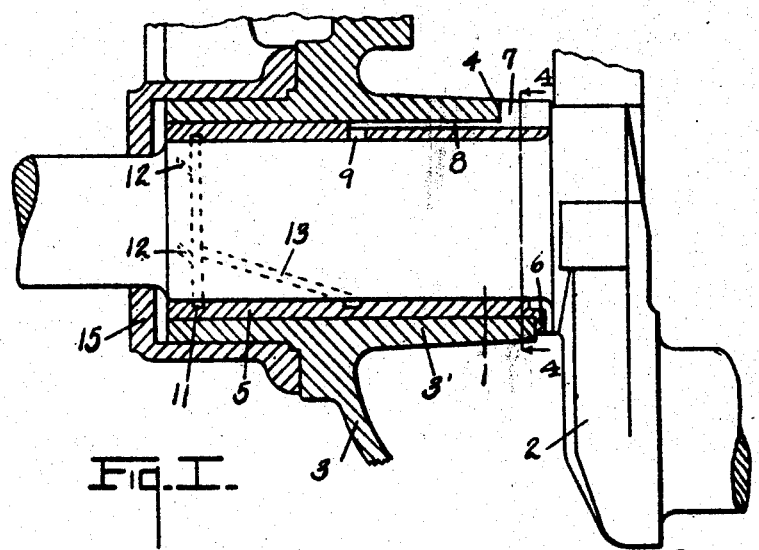
Fig. I.
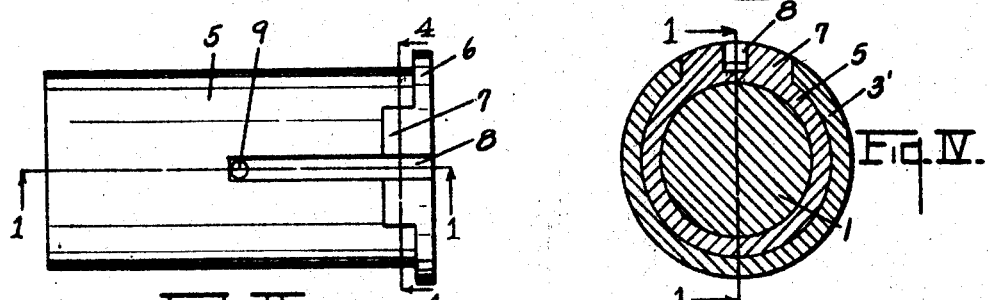
Fig. II.          Fig. IV.
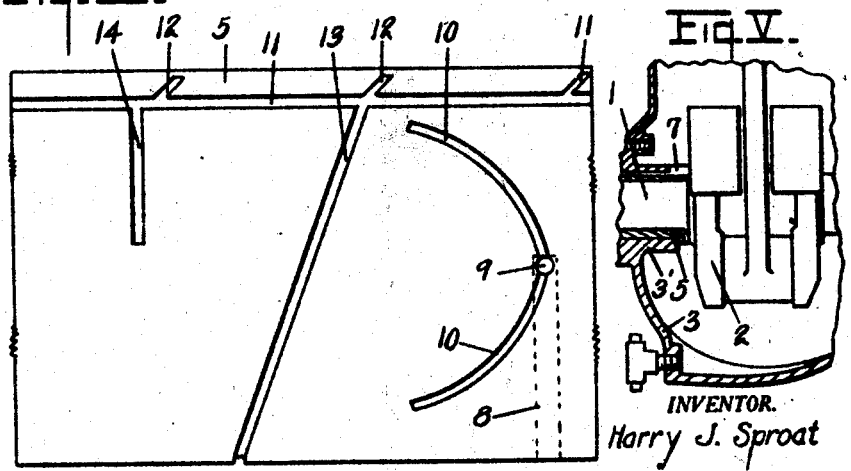
Fig. III.          Fig. V.
INVENTOR.
Harry J. Sproat
BY
Chappell & Earl
ATTORNEYS.

Patented Oct. 13, 1925.

1,556,970

UNITED STATES PATENT OFFICE.

HARRY J. SPROAT, OF LANSING, MICHIGAN, ASSIGNOR TO NEW WAY MOTOR COMPANY, OF LANSING, MICHIGAN.

LUBRICATOR MEANS FOR CRANK SHAFTS IN INTERNAL-COMBUSTION ENGINES.

Application filed May 20, 1922. Serial No. 562,310.

*To all whom it may concern:*

Be it known that I, HARRY J. SPROAT, a citizen of the United States, residing at Lansing, county of Ingham, State of Michigan, have invented certain new and useful Improvements in Lubricator Means for Crank Shafts in Internal-Combustion Engines, of which the following is a specification.

This invention relates to improvements in lubricator means for crank shafts in internal combustion engines.

The objects of the invention are:

First, to provide an improved means for lubricating the bearings of crank shafts of an internal combustion engine and retaining the oil effectively within the engine.

Second, to provide an improved means of distributing the oil in the splash system of an internal combustion engine so that the bearing of the shaft will be completely lubricated without waste or any considerable discharge of the oil to the outside.

Objects pertaining to details and economies of construction and operation will definitely appear from the detailed description to follow.

The objects of the invention are accomplished by the devices and means described in the following specification. The invention is clearly defined and pointed out in the claims.

A structure which is a preferred embodiment of the invention is fully illustrated in the accompanying drawing, forming a part of the application, in which.

Fig. I is a vertical longitudinal detail sectional view through the journal bearing of a crank shaft taken on line 1—1 of Figs. II and IV.

Fig. II is a detail plan view of the bearing bushing with the lubricating passages formed therein.

Fig. III is a detail view of the internal surface of the bearing, showing the relation of the distributing and collecting grooves.

Fig. IV is a detail transverse sectional view taken on line 4—4 of Figs. I and II.

Fig. V is a detail sectional view showing the disposition and arrangement of the crank shaft and throws within the crank case of the engine.

In the drawing similar reference characters refer to similar parts throughout the several views, and the sectional views are taken looking in the direction of the little arrows at the ends of the section lines.

The parts will be referred to by numbers. 1 is the journal of a crank shaft. 2 is the crank throw. 3 is the casing having a bearing shell 3', which is notched at 4 and receives the improved bushing 5. The bushing 5 is flanged at 6 to fit against the inner face of the bearing shell 3', and is provided with a boss 7 fitting within the notch 4. An oil passage 8 is cut longitudinally in the upper surface of the bushing shell through the boss and connects to the oil delivery hole 9 at the center top of the said bearing bushing. Within the bushing are the diverging curved oil grooves 10, 10 connecting to the oil hole 9. At the outer end of the bushing is annular collecting oil groove 11 with oblique annular depressions 12, 12 beyond the same to collect oil from the outer end of the bearing and draw it back to the annular groove 11.

Diagonally across the bottom portion of the bushing is the oil groove 13 for collecting and returning the oil from the bearing inwardly into the crank case. 14 is a transverse oil groove to the opposite side of the bottom from the oil distributing groove 10. It facilitates the flow of oil and the delivery of the same into the annular groove 11 whence it is returned by the diagonal passage 13 to the crank case of the engine. An oil cap 15 closely embraces the outer end of the crank shaft and fits over the end of the bearing shell and may be provided with felt washer or other washer as desired, although it serves its purpose very well merely as a cap.

It is desired to claim the invention specifically as illustrated as well as broadly as pointed out in the appended claims.

Having thus described the invention what is claimed as new and desired to secure by Letters Patent, is:

1. The combination with the crank case for an engine having bearing supporting bosses therein, a bearing bushing for the shaft having a longitudinal groove in the top side of said bushing connecting to an oil hole at the center with diverging grooves in the bearing surface leading from the oil hole in the direction of the rotation of the crank, an annular oil groove in the bearing surface toward the outer end of the said bushing with inwardly inclined indentations in the bearing surface beyond the same, a diagonal groove leading from the annular oil groove across the bottom portion of the bushing to the interior of the crank case, one branch of the diverging grooves leading to a point in close proximity to the cooling groove and return groove, and a cross groove in the bottom portion of the bearing surface leading from near the middle outwardly to the annular groove for the collection of oil and the delivery of the same thereto whereby the lubricant may be distributed over the bearing surface and returned effectively and quickly to the crank case, being thereby effectively circulated over the bearing surface, all coacting as specified.

2. The combination with the crank case for an engine having bearing supporting bosses therein, a bearing bushing for the shaft having a longitudinal groove in the top side of said bushing connecting to an oil hole at the center with diverging grooves in the bearing surface leading from the oil hole in the direction of the rotation of the crank, an annular groove in the bearing surface toward the outer end of the said bushing, a diagonal groove leading from the annular oil groove across the bottom portion of the bushing to the interior of the crank case, one branch of the diverging grooves leading to a point in close proximity to the cooling groove and return groove, and a cross groove in the bottom portion of the bearing surface leading from near the middle out-wardly to the annular groove for the collection of oil and the delivery of the same thereto whereby the lubricant may be distributed over the bearing surface and returned effectively and quickly to the crank case, being thereby effectively circulated over the bearing surface, all coacting as specified.

3. The combination with the crank case for an engine having bearing supporting bosses therein, a bearing bushing for the shaft having a longitudinal groove in the top side of said bushing connecting to an oil hole at the center with diverging grooves in the bearing surface leading from the oil hole in the direction of the rotation of the crank, an annular oil groove in the bearing surface toward the outer end of the said bushing with inwardly inclined indentations in the bearing surface beyond the same, a diagonal groove leading from the annular oil groove across the bottom portion of the bushing to the interior of the crank case, one branch of the diverging grooves leading to a point in close proximity to the cooling groove and return groove, whereby the lubricant may be distributed over the bearing surface and returned effectively and quickly to the crank case, being thereby effectively circulated over the bearing surface, all coacting as specified.

4. The combination with the crank case for an engine having bearing supporting bosses therein, a bearing bushing for the shaft having a longitudinal groove in the top side of said bushing connecting to an oil hole at the center with diverging grooves in the bearing surface leading from the oil hole in the direction of the rotation of the crank, an annular groove in the bearing surface toward the outer end of the said bushing, a diagonal groove leading from the annular oil groove across the bottom portion of the bushing to the interior of the crank case, one branch of the diverging grooves leading to a point in close proximity to the cooling groove and return groove, whereby the lubricant may be distributed over the bearing surface and returned effectively and quickly to the crank case, being thereby effectively circulated over the bearing surface, all coacting as specified.

In witness whereof, I have hereunto set my hand and seal.

HARRY J. SPROAT. [L. s.]